United States Patent
Jajtic et al.

(10) Patent No.: US 8,076,804 B2
(45) Date of Patent: Dec. 13, 2011

(54) LINEAR MOTOR WITH FORCE RIPPLE COMPENSATION

(75) Inventors: Zeljko Jajtic, München (DE); Christian Volmert, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/375,709

(22) PCT Filed: Jul. 26, 2007

(86) PCT No.: PCT/EP2007/057699
§ 371 (c)(1),
(2), (4) Date: Jan. 30, 2009

(87) PCT Pub. No.: WO2008/015149
PCT Pub. Date: Feb. 7, 2008

(65) Prior Publication Data
US 2009/0256428 A1 Oct. 15, 2009

(30) Foreign Application Priority Data
Jul. 31, 2006 (DE) .......................... 10 2006 035 678

(51) Int. Cl.
*H02K 41/03* (2006.01)
*H02K 41/02* (2006.01)

(52) U.S. Cl. ............... 310/12.19; 310/12.01; 310/12.03; 310/12.14; 310/12.15; 310/12.22

(58) Field of Classification Search ............... 310/12.25, 310/27, 12.01–112.33
See application file for complete search history.

(56) References Cited

U.S. PATENT DOCUMENTS

| 4,390,307 | A | * | 6/1983 | Rice ............................... 405/228 |
|---|---|---|---|---|
| 5,250,867 | A | * | 10/1993 | Gizaw ........................... 310/179 |
| 6,713,899 | B1 | * | 3/2004 | Greubel et al. ............ 310/12.18 |
| 7,271,509 | B2 | | 9/2007 | Hoppe et al. |
| 7,332,839 | B2 | * | 2/2008 | Jajtic et al. ................... 310/68 B |
| 7,638,916 | B2 | | 12/2009 | Hoppe et al. |
| 7,800,256 | B2 | | 9/2010 | Jajtic et al. |
| 7,948,123 | B2 | * | 5/2011 | Jajtic et al. ................. 310/12.24 |
| 7,952,237 | B2 | * | 5/2011 | Matscheko et al. ........ 310/12.18 |
| 2004/0251751 | A1 | * | 12/2004 | Wavre et al. ..................... 310/52 |

(Continued)

FOREIGN PATENT DOCUMENTS

DE 198 29 052 C1 12/1999

(Continued)

OTHER PUBLICATIONS

Machine Translation of JP2005253259, linear actuator, Jun. 2005.*

(Continued)

*Primary Examiner* — Tran Nguyen
*Assistant Examiner* — Terrance Kenerly
(74) *Attorney, Agent, or Firm* — Henry M. Feiereisen; Ursula B. Day

(57) ABSTRACT

The invention relates to a primary component (2) for an electric motor (1), said primary component (2) being formed from at least one bundle of laminations (3) and comprises at least one flux guiding element (10) on one or both front faces (S1, S2) to reduce the ripple effect, said primary component (2) being separated from a secondary component (7) by a first air gap ($\delta_1$). The primary component (2) has at least one section ($\delta_2$) in the region of the flux guiding element (10), said section ($\delta_2$) being electrically non-conducting ($K_{el}=0$) and having a negligibly low magnetic permeability ($\mu_r \cong 1$).

12 Claims, 3 Drawing Sheets

U.S. PATENT DOCUMENTS

| | | | |
|---|---|---|---|
| 2004/0256919 A1* | 12/2004 | Hashimoto et al. | 310/12 |
| 2005/0001493 A1* | 1/2005 | Jajtic et al. | 310/68 R |
| 2005/0006959 A1 | 1/2005 | Hoppe et al. | |
| 2007/0222304 A1 | 9/2007 | Jajtic et al. | |
| 2007/0236090 A1 | 10/2007 | Hoppe et al. | |
| 2008/0111430 A1* | 5/2008 | Jenny | 310/12 |
| 2009/0322162 A1* | 12/2009 | Jajtic et al. | 310/12.24 |

FOREIGN PATENT DOCUMENTS

| | | |
|---|---|---|
| DE | 19851883 A1 | 5/2000 |
| DE | 100 41 329 A1 | 3/2002 |
| EP | 0 543 625 A | 5/1993 |
| EP | 1 511 164 A2 | 3/2005 |
| JP | 10285845 A | 10/1998 |
| JP | 2002/209371 A | 7/2002 |
| JP | 2003/199319 A | 7/2003 |
| JP | 2003199319 * | 7/2003 |
| JP | 2005/253259 A | 9/2005 |
| JP | 2005253259 * | 9/2005 |

OTHER PUBLICATIONS

Claussnitzer, Helmut, Prof.Dr., Einführung in die Elektrotechnik, pp. 113-114; 5. Aufl., Stuttgart, Verlag Berliner Union. ISBN 3-408-53526-4; Book; , 1965.

* cited by examiner

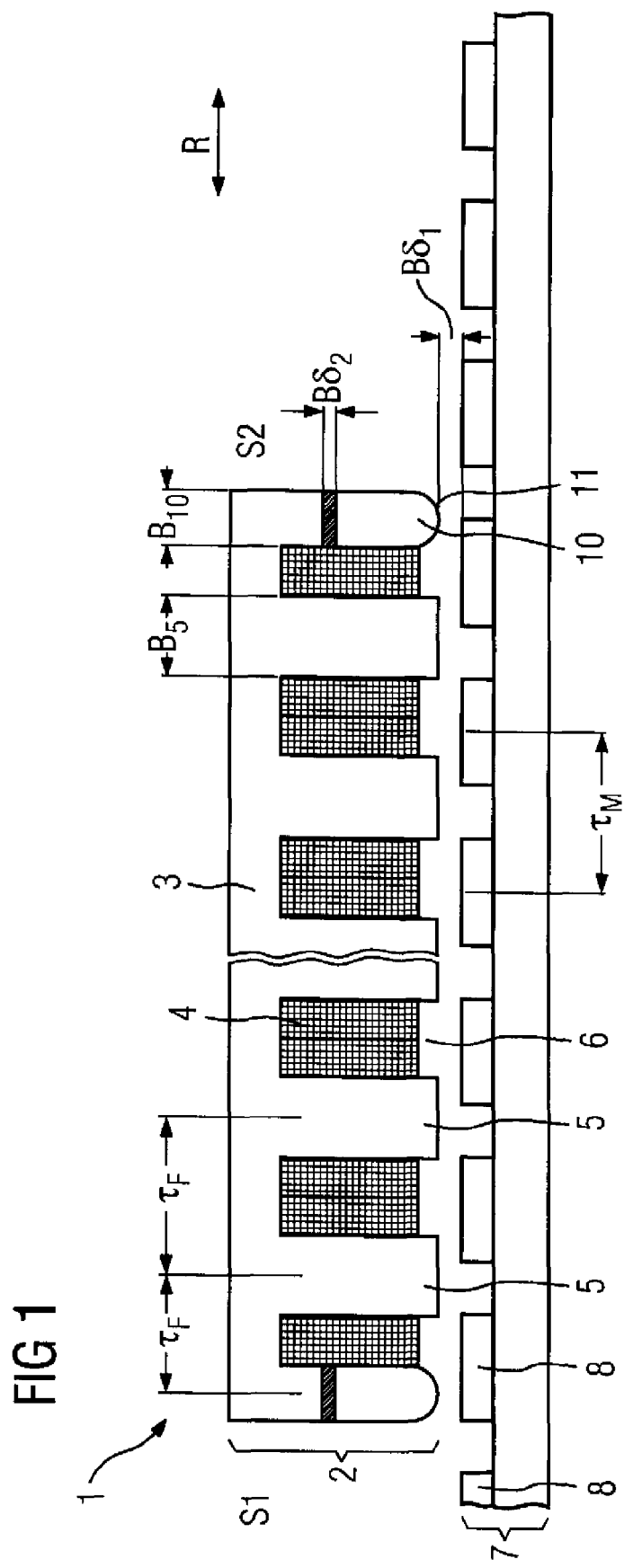

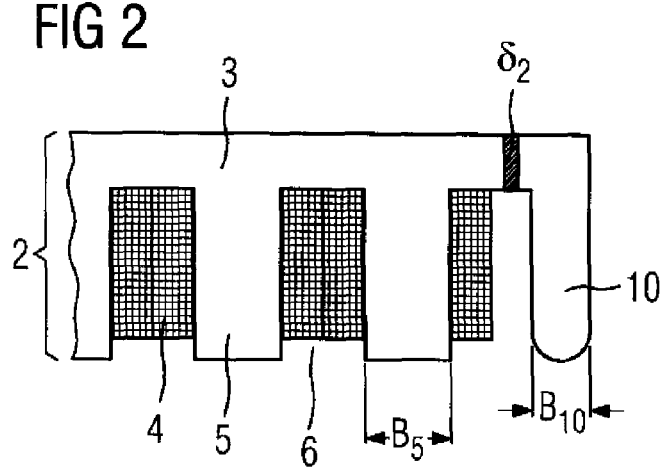
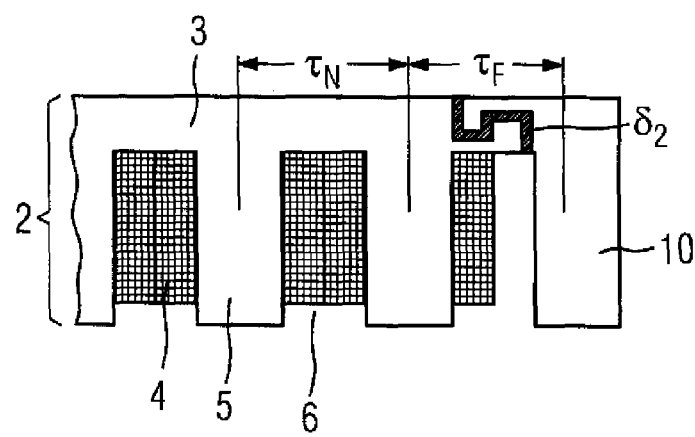
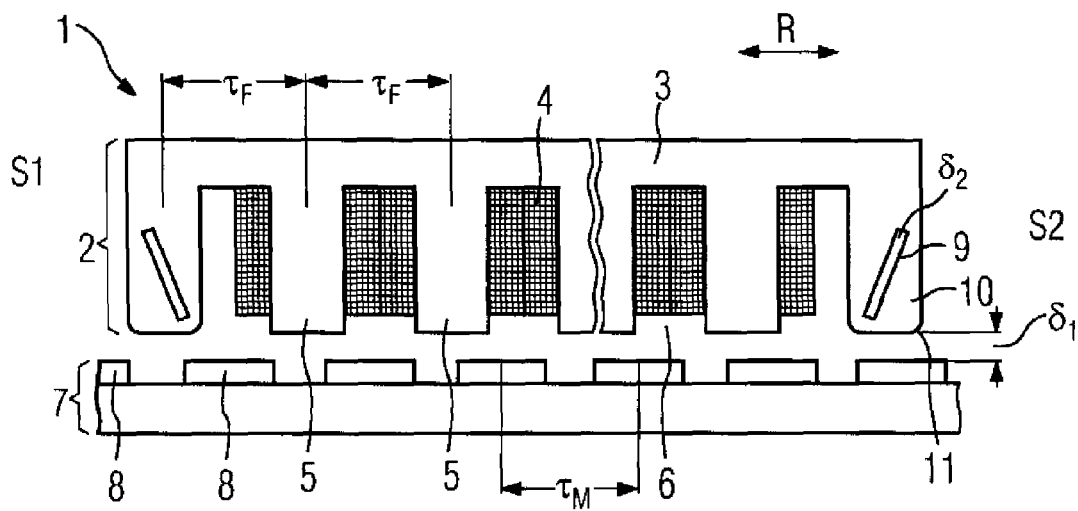

LINEAR MOTOR WITH FORCE RIPPLE COMPENSATION

BACKGROUND OF THE INVENTION

The invention relates to a primary component for an electric machine, the primary component being formed from at least one laminated core and having at least one flux guiding element on one or both front faces to reduce the force ripple. Furthermore, the invention relates to a linear motor with a primary component of this kind.

Linear motors have a primary component and a secondary component. The secondary component in particular is located opposite the primary component. The primary component is designed for energizing with electric current. The secondary component has permanent magnets or energizable windings for example. Both the primary component and the secondary component have active magnetic means for generating magnetic fields.

For constructional reasons, permanently excited linear motors have force variations which have an adverse effect on even running and dynamics. The force variations are due in part to smaller induced voltages in the edge coils.

In order to guide the magnetic flux from the excitation field of the secondary component and main field of the primary component, toothed laminations are normally used for the wound component of the motor (primary component). A magnetic interaction takes place between the excitation poles and the toothed structure of the main field which leads to parasitic cogging forces, also referred to as passive force ripple. This results in vibrations, uneven running and tracking errors in machining processes. Furthermore, the induced voltages, i.e. the electromotive forces (EMF), in the first and last coil on the front faces of the primary component are usually less pronounced than in the middle coils due to the absence of a magnetic return path. This results in the motor not having a symmetrically induced voltage and, an additional current-dependent force ripple, also referred to as active force ripple, is produced besides force losses.

A linear motor is disclosed in U.S. Pat. No. 6,831,379 B2, the primary component of which has auxiliary teeth in addition to the main teeth on the front faces of the laminated core, the auxiliary teeth being spaced apart from the air gap between primary and secondary component by means of an additional air gap. This reduces the passive force ripple of the linear motor, i.e. the cogging force.

The disadvantage here is that, although the cogging force of the linear motor is reduced, the primary component does not have symmetrically induced voltages in the individual windings or coils, i.e. there is no reduction in the active force ripple.

SUMMARY OF THE INVENTION

The object of the present invention is therefore to develop a linear motor of the kind described in such a way that, as well as reducing the cogging forces, the electromotive forces are also symmetrized.

According to one aspect of the invention, the object is achieved by a primary component for an electric machine, the primary component being formed from at least one laminated core and having at least one flux guiding element on one or both front faces to reduce the force ripple, and the primary component being spaced apart from a secondary component by a first air gap, wherein the primary component has at least one section in the region of the flux guiding element, the section having low electrical conductivity and a negligibly small magnetic conductivity.

According to another aspect of the invention, the object is achieved by linear motor having at least one primary component and at least one secondary component, primary component and secondary component being spaced apart from one another by a first air gap, wherein the linear motor has a primary component formed from at least one laminated core and having at least one flux guiding element on one or both front faces to reduce the force ripple, and the primary component being spaced apart from a secondary component by a first air gap, wherein the primary component has at least one section in the region of the flux guiding element, the section having low electrical conductivity and a negligibly small magnetic conductivity.

In contrast to rotating machines, by their nature linear motors have end regions in which the electromagnetic part of the motor finishes. If a linear motor is designed with a short stator, for example, there are two end regions for the primary component which lie in the region of influence of the secondary component. The ends of the primary component interact with the secondary component in such a way that this has a definitive influence on the active force ripple and the passive force ripple (cogging force).

According to the invention, the linear motor has a primary component and a secondary component, the primary component and secondary component being spaced apart from one another by a first air gap. The secondary component has a series of poles formed by permanent magnets. The primary component is formed from one or more laminated cores, the laminated core being made up of a plurality of laminations. The primary component has a plurality of slots and teeth, the slots serving to accommodate the primary component windings or coils. The windings are designed, for example, as a three-phase winding of a three-phase network or of a three-phase alternating current.

In particular, linear motors are designed with fractional slot windings and tooth coils in the primary component, wherein the slot pitch of the primary component is not the same as the pole pitch of the secondary component. For example, the ratio of slot pitch to pole pitch (slot pitch/pole pitch)=8/12, 10/12, 11/12, 13/12, 14/12, 16/12.

A flux guiding element to reduce the force ripple is arranged on one or both front faces of the laminations or laminated core. In the region of the flux guiding element is arranged at least one section which has low electrical conductivity ($\kappa_{e1} \cong 0$) and a negligibly small magnetic conductivity ($\mu_r \cong 1$). This section will be referred to in the following as the 'second air gap'. The air gap essentially extends over the full width and depth of the flux guiding element. The width extends in the direction of motion of the primary component and the depth extends perpendicular to the direction of motion of the primary component.

The electrical conductivity $\kappa_{e1}$ is a physical quantity which specifies the ability of a material to conduct electrical current. The electrical conductivity $\kappa_{e1}$ is linked to the specific electrical resistance $\rho$, the electrical conductivity being the inverse of the specific resistance ($\kappa_{e1} = 1/\rho$).

Materials are divided according to the electrical conductivity into a. conductors (in particular all metals, ($\kappa_{e1} > 0$),
b. insulators or non-conductors (most non-metals, $\kappa_{e1} \cong 0$),
c. semiconductors (e.g. silicon, germanium), where the conductivity lies in the region between conductors and non-conductors, and d. superconductors, whose conductivity below a material-dependent transition temperature is effectively "infinite".

The magnetic permeability p determines the permeability of materials to magnetic fields and is expressed as the ratio of the magnetic flux density B to the magnetic field strength H ($\mu=B/H$), where $\mu$ is made up of the magnetic field constant $\mu_0$ and the specific permeability coefficient of the material $\mu_r$ ($\mu=\mu_0\mu_r$). The permeability coefficient $\mu_r$ is frequently referred to as the relative permeability.

Materials are divided according to the relative permeability $\mu_r$ into a. ferromagnetic materials (e.g. iron, cobalt, nickel, $\mu_r \gg 1$), which significantly strengthen the magnetic field;

b. paramagnetic materials (e.g. aluminum, air, $\mu_r \cong 1$), which strengthen the magnetic field very slightly; and c. diamagnetic materials (e.g. silver, copper, $\mu_r < 1$), which weaken the magnetic field very slightly.

The flux guiding element is fitted to the front faces of the individual laminations or of the whole laminated core and is located on or next to the last slot or last wound tooth of the primary component. The flux guiding element itself has no winding or coil.

The fitting of such a flux guiding element and the formation of a second air gap also enables the active force ripple to be reduced as well as enabling the passive force ripple to be reduced. The induced voltages in the wound end teeth of the primary component are increased, the objective here being an EMF in all coils of the primary component which is as uniform as possible. The flux linkage with regard to the last coil, i.e. the respective edge coil on the front faces of the primary component, can be controlled by the position of the additional air gap.

According to a first embodiment, the laminated core is formed in two pieces together with the flux guiding element, the flux guiding element being positioned with respect to the laminated core so that the second air gap is formed between the laminated core and the flux guiding element in the end region of the laminated core.

The flux guiding element can advantageously be attached to the laminated core by force, by bonding or by interlocking. The flux guiding element is attached to the laminated core by suitable connection means such as gluing, screwing, fastening with a hook or by a dovetail joint for example. The flux guiding element can also be clamped or clipped to the laminated core.

The second air gap can be unfilled, i.e. there is air between the laminated core and the flux guiding element, or formed by means of an electrically non-conductive and magnetically non-conductive material such as plastic, for example. Plastic is an inexpensive material and is easy to process.

One or more laminated cores from which the primary component is made up are produced first. A laminated core consists of a plurality of individual laminations, the individual laminations being joined to form a packet, for example by baking with thermosetting varnish or by pressing. If the primary component consists of a plurality of laminated cores, then these are joined in a corresponding manner. The flux guiding element, which essentially has the form of a tooth of the primary component, is then attached to the two front faces of the primary component, a second gap being formed between laminated core and flux guiding element by means of a plastic layer or a plastic plate, for example. The flux guiding element and the plastic plate can be attached to the laminated core by gluing, screwing or by fastening with a hook.

According to a second embodiment, the laminated core and the flux guiding element are formed in one piece. In doing so, the flux guiding element itself has the second air gap. The laminated core can have flux guiding elements on only one front face or on both front faces.

According to the second embodiment, the flux guiding element is formed when the laminations are manufactured, i.e. the laminations are cut in one piece. The second air gap is then formed, for example, by stamping out a partial area of the flux guiding element. The flux guiding element, which is designed as the end tooth of the primary component, has narrow ligaments in the stamped-out region. The narrow ligaments are magnetically saturated and therefore have only a small effect on the function of the flux guiding element.

It is possible for not every lamination to be provided with a flux guiding element. For example, only every second lamination has a flux guiding element. With single piece primary components, i.e. primary components with only one laminated core, it is possible that every lamination only has a flux guiding element at an end region of the lamination. The individual laminations can then be joined to form the laminated core so that, for example, by rotating the individual laminations, the flux guiding element is aligned to the left or to the right. This adequately reduces the force ripple compared with the previously known options.

The primary component of the linear motor can consist of a plurality of laminated cores arranged one behind the other in the direction of motion. Accordingly, the centrally arranged laminated cores do not have flux guiding elements but, according to the invention, flux guiding elements are arranged only on the respective ends, i.e. the front faces, of the primary component. Here, for example, by rotating a lamination with a right-hand side element it becomes a lamination with a left-hand side element, so that gapless elements are provided on the front faces of this primary component. In the case of primary components with only one laminated core, i.e. one-piece primary components, flux guiding elements can be provided on each front face of the laminated core.

According to the second embodiment, the second air gap is designed as a simple air gap, but can also be filled with a filling material such as plastic for example.

Preferably, the following applies for the width $B_{\delta 2}$ of the second air gap ($\delta 2$): $0<B_{\delta 2}$. The magnetic field in the flux guiding element can be specifically influenced by means of the width of the air gap. The larger the air gap is designed to be, the smaller the magnetic field in the region of the flux guiding element and vice versa.

The magnetic flux in the flux guiding element can be advantageously influenced, for example, by a non-constant width $B_{\delta 2}$ of the second air gap. The sections in the region of the flux guiding elements on the opposing front faces can be designed parallel to one another or otherwise. The section or the second air gap itself can have any geometrical shapes, such as L-shapes or Z-shapes or even elliptical shapes for example. The air gap therefore does not lie in one plane.

Advantageously, the second air gap is formed diagonally with respect to the first air gap. The second air gap preferably begins at the side of the flux guiding element facing the last coil, if possible in the vicinity of the first air gap between primary and secondary component, and runs diagonally or in steps over the width of the flux guiding element to its outside in the region of the side facing away from the first air gap. This enables a better matching between the formation of cogging force and flux linkage with the last coil or winding, i.e. the coil or winding in the slot of the face side.

Preferably, the surface of the flux guiding element opposite the first air gap is rounded. The flux guiding element has rounded corners, for example. This measure contributes to reducing the cogging forces.

In a further embodiment of the invention, the flux guiding element is not formed over the full width of a laminated core. The width of the laminated core extends perpendicular to the direction of motion of the primary component. The flux guiding element therefore only extends over a partial region of the laminated core, for example, wherein the flux guiding element can then be arranged centrally on the laminated core. By forming only partial flux guiding elements, the matching between passive and active force ripple can be carried out according to the particular demands on the linear motor.

With the linear motor according to the invention, the active and passive force ripple is reduced by means of the position or incorporation of the additional air gap in or on the flux guiding element. In particular, incorporating the second air gap results in a symmetrizing of the induced voltage in the windings of the primary component. The flux guiding element serves to reduce the cogging force over the length of the primary component and to increase the useful force of the linear motor.

The flux guiding element has a definable width, wherein the width of the flux guiding element extends in the direction of motion of the primary component. The magnetic flux in the flux guiding element can be specifically influenced in an advantageous manner by means of the width of the flux guiding element.

Furthermore, the flux guiding element is at a distance from the adjacent wound tooth or teeth of the laminated core. Advantageously, the distance between the flux guiding element and the neighboring tooth or teeth is chosen so that it corresponds to the pole pitch of the secondary component, so that as high a flux linkage as possible with the last coil and therefore a desired increase in the induced voltage of the last coil occurs.

For a design of the linear motor which optimizes the installation space, a minimum width and as small a spacing as possible of the flux guiding element are aimed for. This gives an optimum spacing of the flux guiding element from the adjacent wound tooth, which is less than the pole pitch of the secondary component.

If, for example, a high attractive force between primary and secondary component is aimed for, for example for the purpose of a pre-loading force in the case of air suspension, the optimum spacing of the flux guiding element from the adjacent tooth is designed to be greater than the pole pitch of the secondary component.

The primary component according to the invention is preferably provided for a linear motor. The primary component can however also be used in rotating machines, wherein the stator has end regions, such as segmented rotating motors for example.

BRIEF DESCRIPTION OF THE DRAWING

Further characteristics and details of the invention are explained in more detail in the following description in conjunction with the attached drawings with reference to exemplary embodiments. At the same time, characteristics and correlations described in individual variants can basically be transferred to all exemplary embodiments. In the drawings:

FIG. 1 shows a first embodiment of a linear motor with a first arrangement of a flux guiding element;

FIG. 2 shows a detail of a primary component of the linear motor according to FIG. 1 with a second arrangement of the flux guiding element;

FIG. 3 shows a further detail of a primary component of the linear motor according to FIG. 1 with a third arrangement of the flux guiding element;

FIG. 4 shows a second embodiment of a linear motor with a fourth arrangement of the flux guiding element;

DETAILED DESCRIPTION OF PREFERRED EMBODIMENTS

Figure 5:
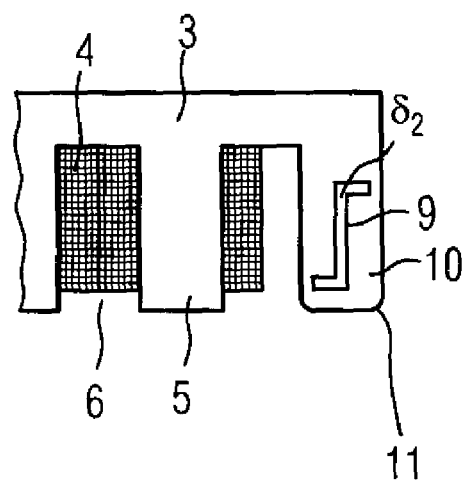
FIG. 5 shows a detail of a primary component of the linear motor according to FIG. 4 with a fifth arrangement of the flux guiding element.

FIG. 1 shows a first embodiment of a linear motor 1 according to the invention with a first arrangement of a flux guiding element 10. FIG. 1 shows a side view of a synchronous linear motor 1 shown in principle, which has one or more laminated cores 3, the respective laminations of which are stacked parallel to the plane of the drawing and which form the primary component 2. The direction of motion of the linear motor 1 is shown by the arrow R. The primary component 2 also has the coils 4. The coils 4 encompass the teeth 5 of the primary component 2 in such a way that different coils 4 are located in one slot 6. Furthermore, the linear motor 1 has the secondary component 7 with the permanent magnets 8. The secondary component 7 is positioned on a machine bed which is not shown in more detail. The permanent magnets 8 are arranged with the pole pitch $\tau_M$. The pole pitch $\tau_M$ can however also be formed by electrical excitation of an excitation winding arranged in the secondary component 7. Primary component 2 and secondary component 7 are spaced apart from one another by the first air gap $\delta 1$.

A flux guiding element 10 for reducing the force ripple is arranged on each of the front faces S1 and S2 of the laminated core 3, a second air gap $\delta 2$ being formed on the flux guiding element 10. By way of example, the flux guiding element 10 has the same geometrical dimensions as a tooth 5 of the laminated core 3, wherein the surface 11 of the flux guiding element 10 opposite the first air gap $\delta 1$ is rounded. The surface 11 can also have only rounded corners with a specified radius.

The laminated core 3 and the flux guiding element 10 are designed in two pieces. The element 10 is attached to the laminated core 3 by force, by bonding or by interlocking. The flux guiding element 10 is attached to the laminated core 3 by suitable connection means such as gluing, screwing, fastening with a hook or by a dovetail joint for example. The flux guiding element 10 can also be clamped or clipped to the laminated core 3. The second air gap $\delta 2$ is formed by means of an electrically and magnetically non-conducting material such as a plastic plate for example.

The flux guiding element 10 has the definable width $B_{10}$, wherein the width $B_{10}$ of the flux guiding element 10 extends in the direction of motion of the primary component 2.

Furthermore, the flux guiding element 10 is at a distance $\tau_F$ from the adjacent wound tooth 5 of the laminated core 3. For a design of the linear motor 1 which optimizes the installation space, a minimum width $B_{10}$ and as small a spacing $\tau_F$ as possible of the flux guiding element 10 from the adjacent tooth 5 are aimed for.

FIG. 2 and FIG. 3 show different arrangements of the primary component 2 and the flux guiding element 10 as well as the second air gap δ2 located on the element 10.

FIG. 2 shows a flux guiding element 10, the width $B_{10}$ of which corresponds to the width $B_5$ of a tooth 5 of the laminated core 3. The air gap δ2 is arranged perpendicular to the air gap δ1 (not shown) between primary component 2 and secondary component 7 (not shown).

FIG. 3 shows a flux guiding element 10, which has no rounded corners on the side facing the air gap δ1 (not shown). The second air gap δ2 is arranged so that the flux guiding element 10 can be fastened to the laminated core with a hook. The distance $\tau_F$ of the flux guiding element 10 from the adjacent wound tooth 5 corresponds to the slot pitch $\tau_N$ of the primary component 2.

FIG. 4 shows a second embodiment of the linear motor 1, wherein laminated core 3 and flux guiding element 10 are designed in one piece. The flux guiding element 10 itself has the second air gap δ2. The air gap δ2 is formed by stamping out a partial area of the element 10. The flux guiding element 10, which is designed as the end tooth of the primary component 2, has narrow ligaments 9 in the stamped-out region. When the motor 1 is put into operation, the narrow ligaments 9 are magnetically saturated and therefore have almost no effect on the function of the flux guiding element 10. According to the second embodiment shown in FIG. 4, the second air gap δ2 is designed as a simple air gap, but can also be filled with a filling material such as plastic for example.

As can be seen from FIG. 4, the second air gap 82 is formed diagonally with respect to the first air gap δ1, particularly in the case of the one-piece embodiment of the laminated core 3 and element 10. The second air gap δ2 runs diagonally over the width $B_{10}$ of the flux guiding element 10. This enables a better matching between the formation of cogging force and flux linkage with the last coil or winding 4, i.e. the coil or winding in the slot 6 of the face side S2.

Figure 6:
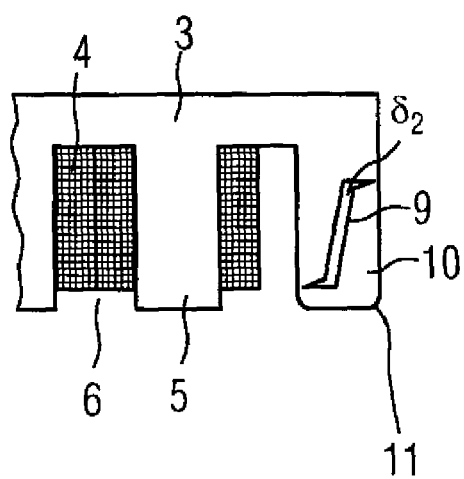
FIG. 6 shows a further detail of a primary component of the linear motor according to FIG. 4 with a sixth arrangement of the flux guiding element.

FIG. 5 and FIG. 6 show further arrangements of the flux guiding element 10. The section or the second air gap 82 itself can have any geometrical shapes, such as L-shapes or Z-shapes or even elliptical shapes for example.

What is claimed is:

1. A primary component for a linear motor, comprising: a magnetically conducting laminated core having teeth projecting towards a secondary component of the linear motor and encompassed by coils, and a magnetically conducting tooth without a coil arranged on an end region of the laminated core and having a free section projecting towards the secondary component of the linear motor and forming a flux guiding element for reducing force ripple, said free section formed in two pieces and comprising at least one plastic section having low electrical conductivity and a negligibly small magnetic conductivity and providing a defined gap with a defined gap spacing between the two pieces, said at least one plastic section arranged between the two pieces in a plane extending substantially perpendicular a projection direction of the free section, said teeth and the tooth without a coil being spaced apart from the secondary component by a first air gap.

2. The primary component of claim 1, wherein the flux guiding element is attached to the laminated core by force, by bonding or by interlocking.

3. The primary component of claim 1, wherein the flux guiding element is spaced apart from a neighboring tooth of the laminated core by a predefined distance which is governed by the relationship $\tau_F = \tau_M$, wherein $\tau_F$ is the distance, and $\tau_M$ is a pole pitch of the secondary component.

4. The primary component of claim 1, wherein the flux guiding element is spaced apart from a neighboring tooth of the laminated core by a predefined distance which is governed by the relationship $\tau_F < \tau_M$, wherein $\tau_F$ is the distance, and $\tau_M$ is a pole pitch of the secondary component.

5. The primary component of claim 1, wherein the flux guiding element is spaced apart from a neighboring tooth of the laminated core by a predefined distance which is governed by the relationship $\tau_F > \tau_M$, wherein τF is the distance, and $\tau_M$ is a pole pitch of the secondary component.

6. The primary component of claim 1, wherein the flux guiding element has a surface in confronting relationship to the first air gap, said surface being rounded with a predefined radius.

7. A linear motor, comprising:
a primary component including a magnetically conducting laminated core having teeth encompassed by coils and a magnetically conducting tooth without a coil arranged on an end region of the laminated core, said tooth without a coil comprising a free section extending parallel to the teeth encompassed by coils and forming a flux guiding element for reducing force ripple, said free section formed in two pieces and comprising at least one plastic section having low electrical conductivity and a negligibly small magnetic conductivity and providing a defined gap with a defined gap spacing between the two pieces, said at least one plastic section arranged between the two pieces in a plane extending substantially perpendicular a projection direction of the free section; and
a secondary component spaced apart from the primary component by a first air gap.

8. The linear motor of claim 7, wherein the flux guiding element is attached to the laminated core by force, by bonding or by interlocking.

9. The linear motor of claim 7, wherein the flux guiding element is spaced apart from a neighboring tooth of the laminated core by a predefined distance which is governed by the relationship $\tau_F = \tau_M$, wherein $\tau_F$ is the distance, and $\tau_M$ is a pole pitch of the secondary component.

10. The linear motor of claim 7, wherein the flux guiding element is spaced apart from a neighboring tooth of the laminated core by a predefined distance which is governed by the relationship $\tau_F < \tau_M$, wherein $\tau_F$ is the distance, and $\tau_M$ is a pole pitch of the secondary component.

11. The linear motor of claim 7, wherein the flux guiding element is spaced apart from a neighboring tooth of the laminated core by a predefined distance which is governed by the relationship $\tau_F > \tau_M$, wherein $\tau_F$ is the distance, and $\tau_M$ is a pole pitch of the secondary component.

12. The linear motor of claim 7, wherein the flux guiding element has a surface in confronting relationship to the first air gap, said surface being rounded with a predefined radius.

* * * * *